United States Patent
Zaniboni

(10) Patent No.: US 6,672,676 B2
(45) Date of Patent: Jan. 6, 2004

(54) WHEEL OVERMASK

(75) Inventor: Giovanni Zaniboni, Pognano (IT)

(73) Assignee: Lupini Targhe S.r.l., Pognamo (IT)

( * ) Notice: Subject to any disclaimer, the term of this patent is extended or adjusted under 35 U.S.C. 154(b) by 0 days.

(21) Appl. No.: 10/188,327

(22) Filed: Jul. 3, 2002

(65) Prior Publication Data

US 2003/0020322 A1 Jan. 30, 2003

(30) Foreign Application Priority Data

Jul. 5, 2001 (EP) ............................................. 01830454

(51) Int. Cl.⁷ ................................................. B60B 7/00
(52) U.S. Cl. .............................. 301/37.101; 301/37.108
(58) Field of Search ......................... 301/37.101, 37.43, 301/37.102, 37.11, 37.108, 37.109, 37.42, 37.41, 37.339

(56) References Cited

U.S. PATENT DOCUMENTS

| | | | | |
|---|---|---|---|---|
| 4,254,650 A | * | 3/1981 | Ash ............................... | 72/357 |
| 4,874,206 A | * | 10/1989 | Sampson ................ | 301/37.103 |
| 5,031,966 A | | 7/1991 | Oakey .......................... | 301/37 |
| 5,457,886 A | * | 10/1995 | Fuller ..................... | 29/894.381 |
| 5,458,401 A | * | 10/1995 | Baccman .................. | 301/37.43 |
| 5,461,779 A | * | 10/1995 | Beam ..................... | 29/894.381 |
| 5,577,809 A | * | 11/1996 | Chase ....................... | 301/37.43 |
| 5,630,654 A | * | 5/1997 | Chase ....................... | 301/37.43 |
| 5,636,906 A | * | 6/1997 | Chase ....................... | 301/37.43 |
| 5,795,035 A | * | 8/1998 | Fuller ....................... | 301/37.32 |
| 5,803,552 A | * | 9/1998 | Kato et al. ................ | 301/37.41 |
| 6,247,760 B1 | * | 6/2001 | Kinoshita ................ | 301/37.34 |
| 6,406,100 B1 | * | 6/2002 | Kinstler ................... | 301/37.43 |
| 6,460,938 B1 | * | 10/2002 | Baumgarten ............. | 301/37.11 |
| 6,502,308 B1 | * | 1/2003 | Carfora et al. .......... | 29/894.381 |
| 6,554,371 B2 | * | 4/2003 | Maloney et al. ........ | 301/37.101 |

FOREIGN PATENT DOCUMENTS

| | | |
|---|---|---|
| DE | 4321057 A1 | 1/1994 |
| DE | 19804776 A1 | 8/1999 |
| EP | 0956976 A2 | 11/1999 |
| FR | 2600284 | 12/1987 |
| GB | 2109317 A | 6/1983 |

* cited by examiner

Primary Examiner—S. Joseph Morano
Assistant Examiner—Long Bao Nguyen
(74) Attorney, Agent, or Firm—Jacobson Holman PLLC

(57) ABSTRACT

A wheel overmask for a vechicle having a wheel made of aluminium or alminium alloy. The overmask includes a body of the same material as the wheel and is conformed to the same shape as the contact surface of the wheel to which it is applied.

4 Claims, 4 Drawing Sheets

WHEEL OVERMASK

FIELD OF THE INVENTION

The present invention relates to a wheel overmask.

More specifically, the present invention relates to an overmask for an aluminium or aluminium-alloy wheel.

BACKGROUND OF THE INVENTION

The prior art includes plastic wheel covers made in appropriate shapes and having means for their connection to the wheels of vehicles.

Being relatively inexpensive to manufacture, such wheel covers are widely used in the less expensive vehicles. However, they have the serious drawback of having little aesthetic value and appeal. Moreover, the plastic material from which these wheel covers are made tends to deform and/or develop splits during the working life of the vehicle.

On the other hand, aluminium or aluminium-alloy wheels are also known to be used in more prestigious vehicles.

However, the curved and irregular surface of the wheel itself makes it difficult to carry out further treatment intended to give it greater aesthetic appeal such as, for example, polishing, application of text or logos, or screen printing.

The problem addressed by the present invention is therefore how to avoid the abovementioned drawbacks by providing, for aluminium or aluminium-alloy wheels, an overmask capable of maintaining its shape throughout the life of the vehicle and at the same time capable of giving the wheel an attractive aesthetic appearance.

SUMMARY OF THE INVENTION

The problems set out above are overcome by means of a wheel overmask as delineated in the appended claims.

Another aspect of the present invention is an aluminium or aluminium-alloy wheel comprising the wheel overmask according to the present invention.

A third aspect of the present invention is a process for manufacturing the wheel overmask of the invention.

A fourth aspect of the present invention is a process for assembling the wheel overmask of the invention to the wheel.

In the present description and in the accompanying claims, the expression "wheel overmask" is used to mean a structure having the same shape as the wheel to which it is applied.

The expression "visible face of the wheel overmask" is used to mean that face of the mask which is visible once applied to the wheel of the vehicle.

The expression "contact surface of the wheel" is used to mean that surface of the wheel that comes into contact with the overmask.

The expression "all the way around the peripheral edge" is used to mean around the entire periphery of the contact surface of the wheel or around the entire periphery of the opposite face from the visible face of the wheel overmask, which hence comprises the peripheral ring, the spokes and the central portion, the latter consisting of the holes for housing the bolts and the central hole for housing the hub.

BRIEF DESCRIPTION OF THE DRAWINGS

Other features and advantages of the wheel overmask forming the subject of the present invention will become clearer in the course of the description of a number of preferred embodiments offered here by way of non-limiting guidance, with reference to the following figures in which.

DETAILED DESCRIPTION OF THE PREFERRED EMBODIMENTS

Figure 2:
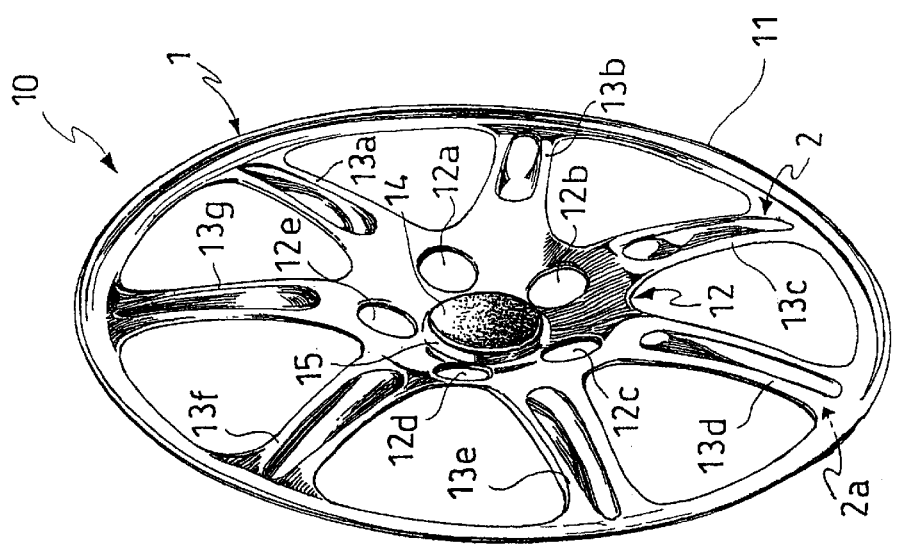
FIG. 2 is a perspective view of the wheel overmask seen in FIG. 1.
Figure 1:
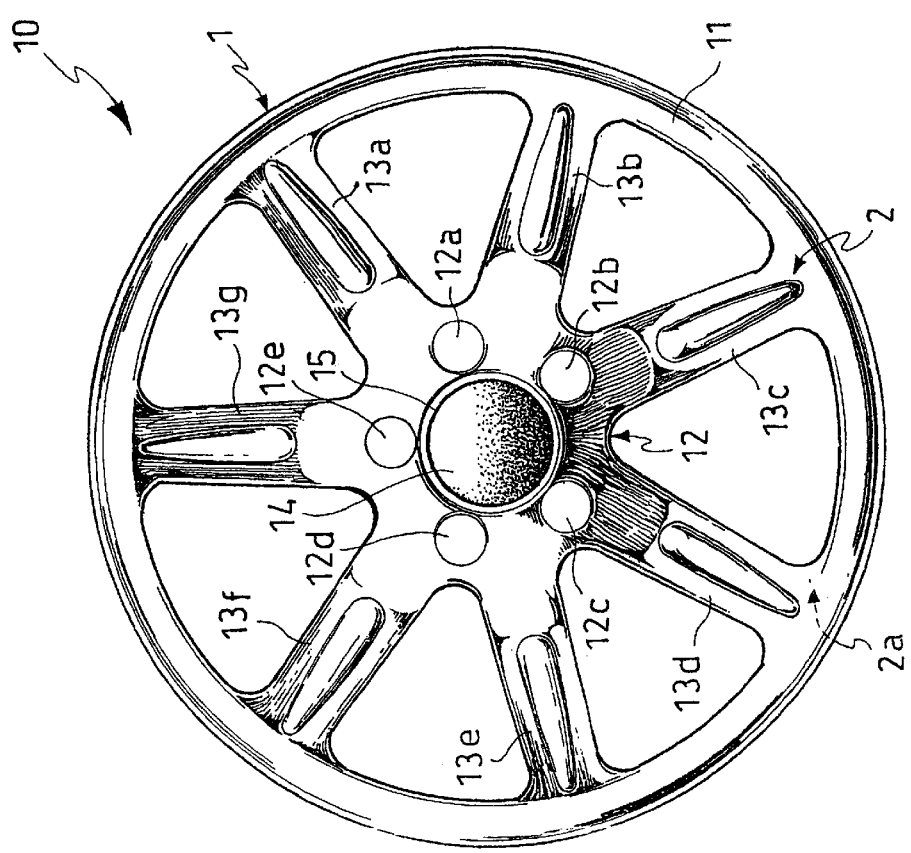
FIG. 1 is a front view of the wheel overmask according to the present invention.

As shown in FIGS. 1 and 2, the wheel overmask according to the present invention is indicated as a whole by the number 10 and comprises a body 1 composed of a peripheral ring 11 and a central portion 12, the said peripheral ring 11 and the said central portion 12 being connected together by spokes 13a, 13b, 13c, 13d, 13e, 13f, 13g. The said central portion 12 comprises holes for the bolts 12a, 12b, 12c, 12d, 12e arranged in a circle and housing the bolts in such a way that the latter are easily accessible from the outside. The said central portion 12 further comprises a hub cap portion 14 in the centre of the circle defined by the holes for the bolts 12a, 12b, 12c, 12d, 12e, over the hub. The said hub cap portion 14 is bounded by a circular profile 15 in relief.

Advantageously, the said wheel overmask 10 is composed of a single sheet of aluminium or aluminium alloy and is of the same material as the wheel to which it is applied. Furthermore, the said wheel overmask 10 has the same shape as the contact surface of the wheel which it covers. The number of spokes 13a, 13b, 13c, 13d, 13e, 13f, 13g, and the number of holes for the bolts 12a, 12b, 12c, 12d, 12e will therefore be the same as those of the wheel.

The aluminium or aluminium-alloy sheet that forms the body 1 of the wheel overmask 10 preferably has a thickness of between 0.3 and 1.5 mm, still more preferably between 0.5 and 1 mm.

The wheel overmask 10 also shows a visible face 2 which is processed in such a way that there are, along the spokes 13a, 13b, 13c, 13d, 13e, 13f, 13g, grooves designed to give the said wheel overmask 10 an attractive appearance.

Other examples of treatments that can be carried out on the aluminium or aluminium-alloy sheet forming the body 1 of the wheel overmask 10 are chosen from the group comprising polishing, application of text or logos, screenprinting, multifinish treatment and a machine effect.

The expression "machine effect" is used to mean brush machining with a circular or radial movement.

The abovementioned treatments may concern only certain parts of the said visible face 2 such as the spokes 13a, 13b, 13c, 13d, 13e, 13f, 13g, the peripheral ring 11 and the central portion 12, or alternatively the said treatment may extend to the whole of the visible face 2.

Figure 3:
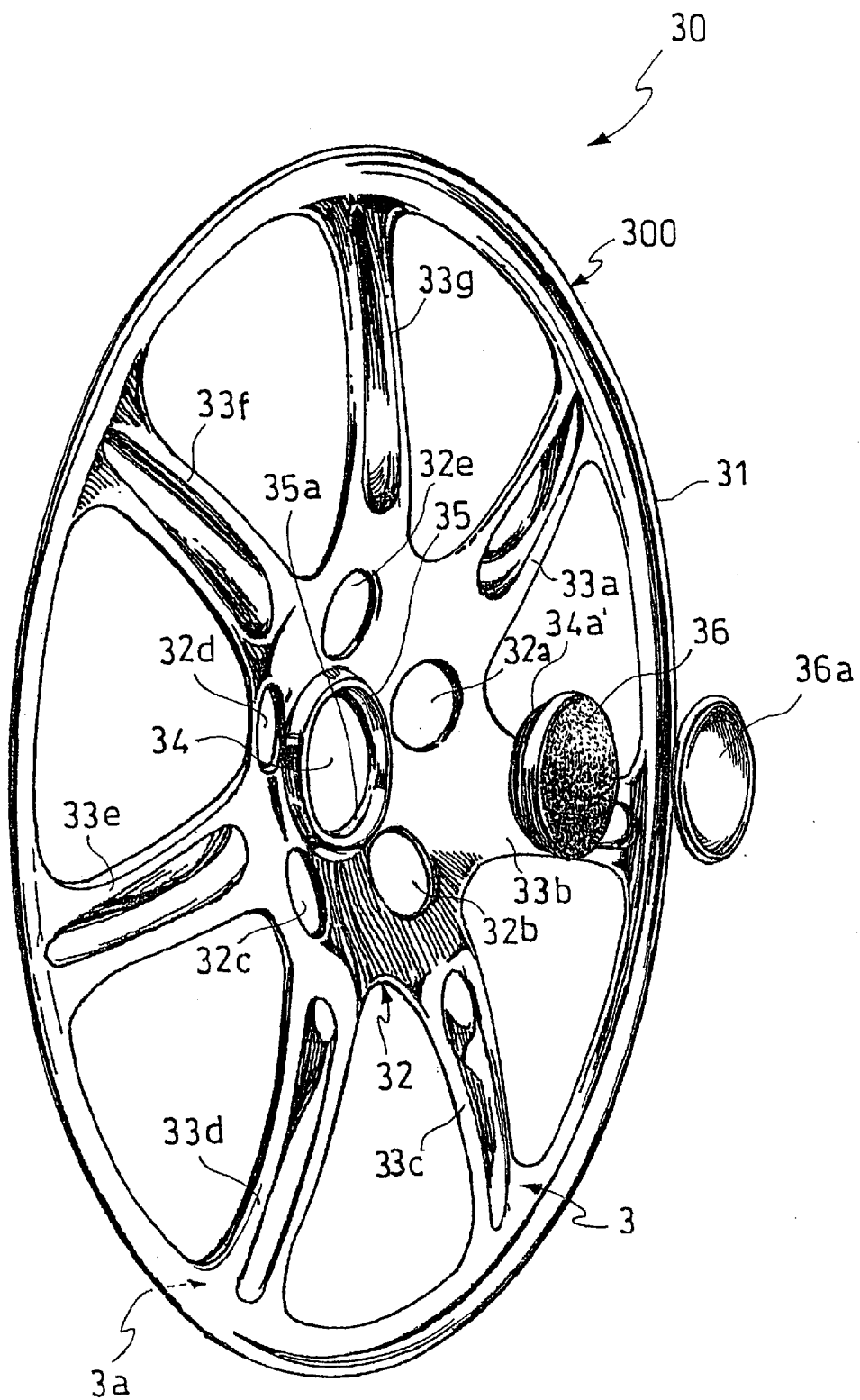
FIG. 3 is an exploded view of a second embodiment of the wheel overmask of the present invention.

As shown in the second embodiment in FIG. 3, the wheel overmask 30 according to the present invention has a body 300 composed of a peripheral ring 31 and a central portion 32, the said peripheral ring 31 and the said central portion 32 being connected to each other by spokes 33a, 33b, 33c, 33d, 33e, 33f, 33g, 33h. The said central portion 32 comprises holes for the bolts 32a, 32b, 32c, 32d, 32e set out in a circle and housing the bolts in such a way that the bolts are easily accessible from the outside. The said central portion 32 further comprises a raised ring 35 that defines a hole for the hub 34 set in the centre of the circle defined by the bolt holes 32a, 32b, 32c, 32d, 32e and housing the hub. The said hole for the hub 34 is closed by a plastic disc 36 with a groove 34a' around its peripheral edge that matches a groove 35a present on the central portion 32 next to the raised ring 35 defining the hole for the hub 34.

The said hole for the hub 34 is therefore closed by bringing together the groove 34a' of the disc 36 and the groove 35a of the raised ring 35.

A circular aluminium or aluminium-alloy element 36a is glued to the said disc 36.

The wheel overmask 30 also shows a visible face 3, treated in such a way that along the spokes 33a, 33b, 33c, 33d, 33e, 33f, 33g there are grooves such as to give the said wheel overmask 30 an attractive appearance, and a face on the opposite side from the visible face 3a designed to be placed in contact with the contact surface 42 of the wheel.

Figure 4:
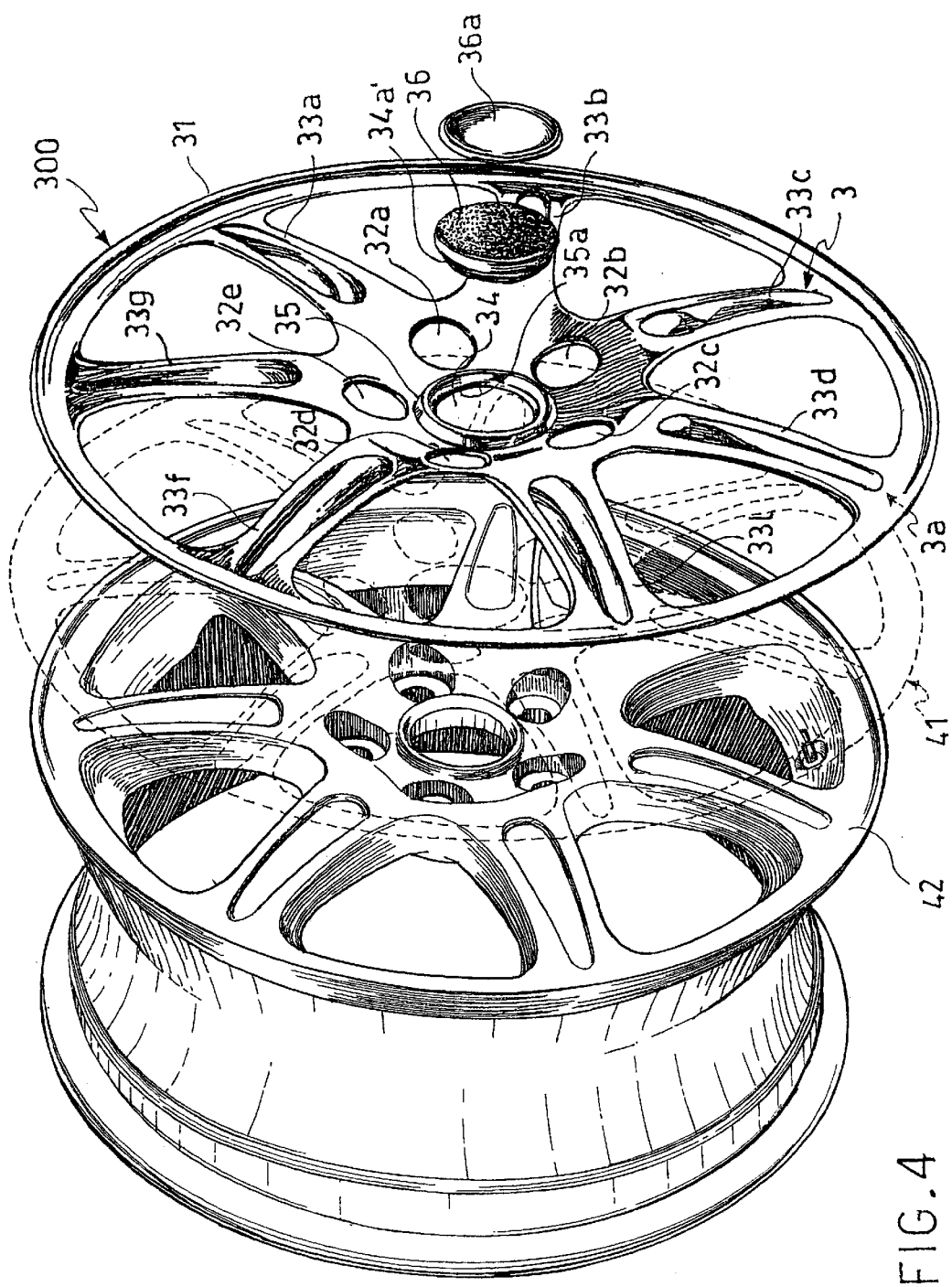
FIG. 4 is an exploded view comprising the wheel overmask seen in FIG. 3, the adhesive material for anchoring the wheel overmask of the present invention to the wheel and a wheel made of aluminium or aluminium alloy.

As shown in FIG. 4, an adhesive material 41 is placed between the contact surface 42 of the wheel and the wheel overmask 10 seen in FIG. 3.

Figure 5:
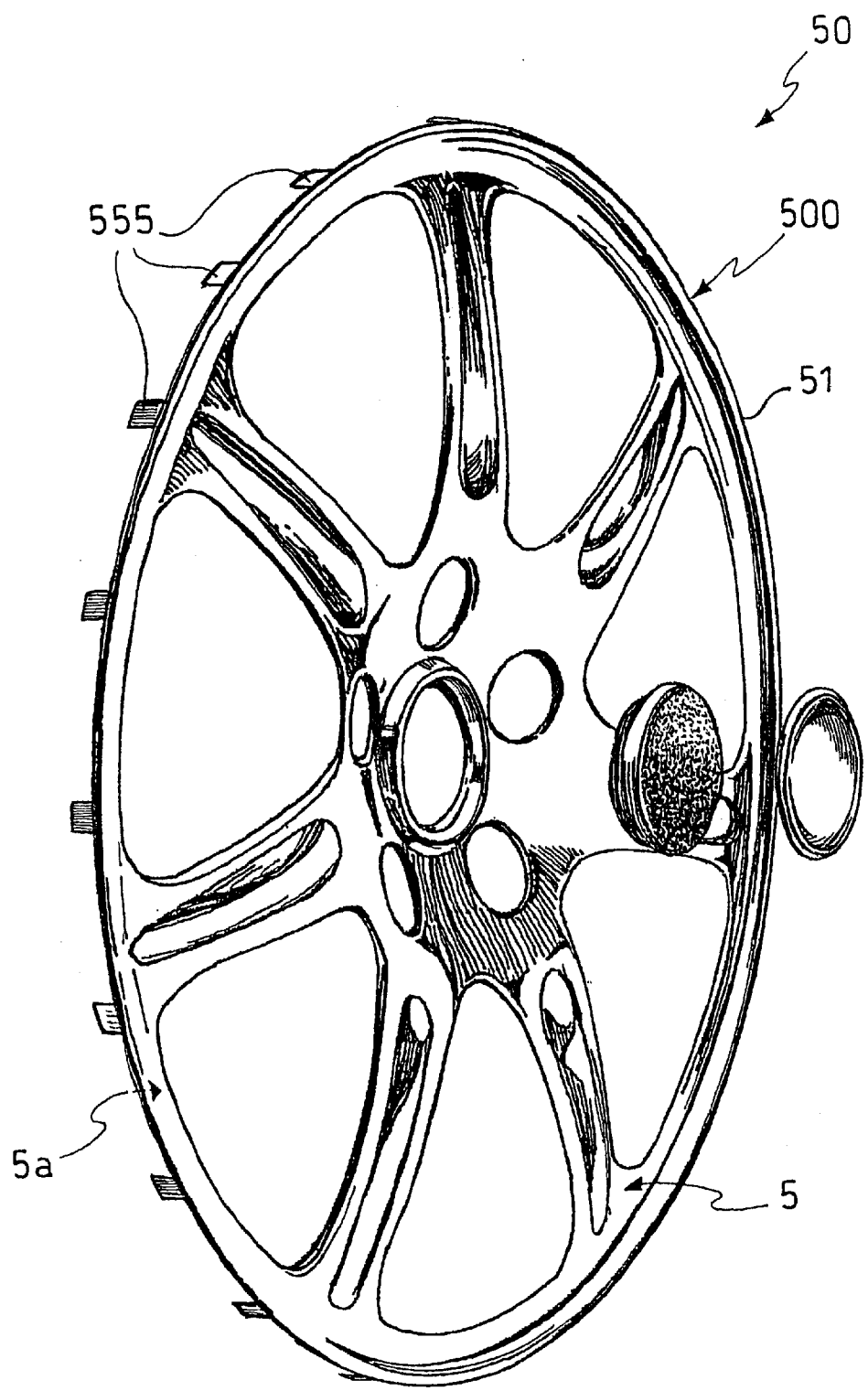
FIG. 5 is a perspective view of the wheel overmask in a third embodiment of the present invention.

As shown in the third embodiment in FIG. 5, the wheel overmask 50 is similar to those of FIGS. 1 and 2, and, in particular, comprises a body 500 exactly like the bodies 10 and 30 described earlier, but differs from that in FIGS. 1 and 2 by the presence of means of anchorage 555 arranged around the peripheral ring 51.

The said anchorage means 555 are preferably represented by tabs projecting from the peripheral ring 51 towards a face 5a, opposite a visible face 5, the said face 5a being designed to be placed in contact with the contact surface (not shown) of a wheel exactly like that described with reference to FIG. 4.

Furthermore, the anchorage means 555 are made of the same material as the overmask 50 or of some other material so long as it allows the said anchorage means 555 to be bent and attached to a peripheral edge (not shown) of the abovementioned contact surface of a wheel.

This wheel overmask 10; 30; 50 is prepared by a process that comprises the steps of a) processing at least that portion of an aluminium or aluminium-alloy plate that is to form the visible face 2; 3; 5 of the wheel overmask 10; 30; 50 in such a way as to give the said visible face 2; 3; 5 an aesthetic value, b) shearing the plate portion from step a), and c) deforming the plate made in step b) to the same shape as the contact surface 42 of the wheel to which it is to be applied.

The abovementioned steps a) and b) can be performed in any order: the treatment step a) is preferably performed before the shearing step b).

Preferably, the abovementioned deforming step c) is carried out by stamping the aluminium or aluminium-alloy plate, to form the wheel overmask 10; 30; 50, on a die representing the shape of the contact surface 42 of the wheel.

The wheel overmask 10; 30; 50 obtained as described above is preferably assembled to the wheel by a process comprising the steps of a) applying an adhesive material 41 to the contact surface 42 of the wheel and b) placing the wheel overmask 10; 30; 50 in contact with the contact surface 42 of the wheel prepared in step a) in such a way that the opposite face 2a; 3a; 5a of the wheel overmask 10; 30; 50 from the visible face 2; 3; 5 glues to the contact surface 42 of the said wheel.

The gluing step b) is preferably followed by an anchorage step c).

This anchorage step c) is performed with the abovementioned anchorage means 555.

The adhesive material 41 can be applied to the contact surface 42 of the wheel, as described in step a), on the opposite face 2a; 3a; 5a from the visible face 2; 3; 5 of the wheel overmask 10; 30; 50, or on both faces.

The said adhesive material 41 is preferably applied all the way around the peripheral edge of the contact surface 42 of the wheel or of the opposite face 2a; 3a; 5a from the visible face 2; 3; 5 of the wheel overmask 10; 30; 50, or of both faces.

Still more preferably, the said adhesive material 41 is applied all the way around the peripheral edge of the contact surface 42 of the wheel.

The said adhesive material 41 is preferably chosen from those based on polyurethanes and silicones.

It will be immediately clear from the above account what the advantages are of the wheel overmask of the present invention.

One advantage is that, since the wheel overmask and the wheel are both made of the same material, they both have the same coefficient of thermal expansion. This prevents the development of deformations due, for example, to overheating of the wheel during braking when high temperatures are reached (>80° C.).

A second advantage is that the wheel overmask can easily be treated while still in the form of a flat sheet, and only deformed afterwards. This avoids treating curved parts or parts having recesses that are difficult to get at.

A third advantage is that the adhesive material used for placing the wheel overmask in contact with the wheel, being applied all the way around the peripheral edge of the contact surface of the wheel or of the non-visible face of the wheel overmask, or on both these faces, also acts as a seal preventing infiltration of rainwater. If rainwater were to accumulate between the wheel and the wheel overmask while the vehicle was in use, it would increase the weight of the wheel and tend to unbalance it.

In addition, the anchorage means 555 further enhance the adhesion of the overmask to the wheel.

Clearly, what are described above are only certain particular embodiments of the wheel overmask of the present invention, to which those skilled in the art will be able to make all such modifications as may be necessary for its adaptation to particular applications, without thereby departing from the scope of protection of the present invention.

That which is claimed is:

1. Process for assembling, to a wheel, a wheel overmask for a vehicle, said wheel being made of aluminium or aluminium alloy and said overmask comprising a body of a same material as the wheel and conformed to the same shape as a contact surface of the wheel to which it is applied, said body having a visible surface that has undergone aesthetic-type treatments, said process comprising the steps of a) applying an adhesive material to the contact surface of the wheel, b) placing the wheel overmask in contact with the contact surface of the wheel prepared in step a) in such a way that an opposite face of the wheel overmask from a visible face is glued to the contact surface of the wheel, and c) anchoring the wheel overmask to the wheel.

2. Process according to claim 1, wherein the anchorage step c) is performed with tabs that fold over a peripheral edge of the contact surface of the wheel.

3. Process for assembling, to a wheel, a wheel overmask for a vehicle, said wheel being made of aluminium or aluminium alloy and said overmask comprising a body of a same material as the wheel and conformed to the same shape as a contact surface of the wheel to which it is applied, said body having a visible surface that has undergone aesthetic-type treatments, said process comprising the steps of
   a) applying an adhesive material to the contact surface of the wheel, and
   b) placing the wheel overmask in contact with the contact surface of the wheel prepared in step a) in such a way that an opposite face of the wheel overmask from a visible face is glued to the contact surface of the wheel, the adhesive material being applied all the way around a peripheral edge of the contact surface of the wheel.

4. Process for assembling, to a wheel, a wheel overmask for a vehicle, said wheel being made of aluminium or aluminium alloy and said overmask comprising a body of a same material as the wheel and conformed to the same shape as a contact surface of the wheel to which it is applied, said body having a visible surface that has undergone aesthetic-type treatments, said process comprising the steps of
   a) applying an adhesive material to the contact surface of the wheel, and
   b) placing the wheel in contact with the contact surface of the wheel prepared in step a) in such a way that an opposite face of the wheel overmask from a visible face is glued by an adhesive material to the contact surface of the wheel, said adhesive material being chosen from polyurethane and silicone based material.

* * * * *